R. Wildman.
Forming Bats.

Nº 14330. Patented Feb. 26, 1856.

UNITED STATES PATENT OFFICE.

RUSSEL WILDMAN, OF CHARLESTOWN, MASSACHUSETTS.

MACHINERY FOR HARDENING HATS.

Specification of Letters Patent No. 14,330, dated February 26, 1856.

*To all whom it may concern:*

Be it known that I, RUSSEL WILDMAN, of Charlestown, in the county of Middlesex and State of Massachusetts, have invented a new and Improved Method of Hardening Hat-Bodies, of which the following is a full, clear, and exact description, reference being had to the annexed drawings, making part of this specification, in which—

Figure 4:
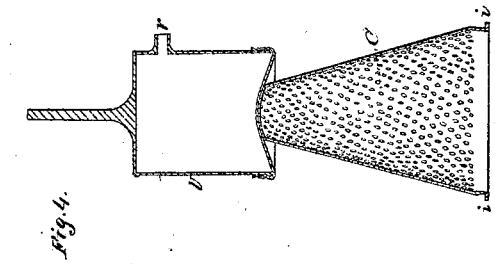
Figure 3:
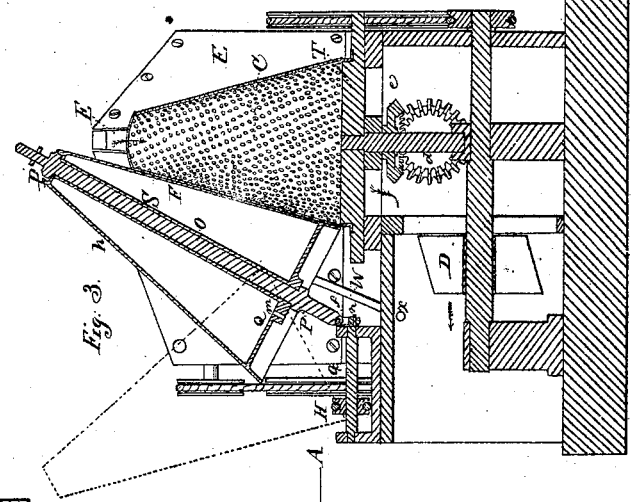
Figure 2:
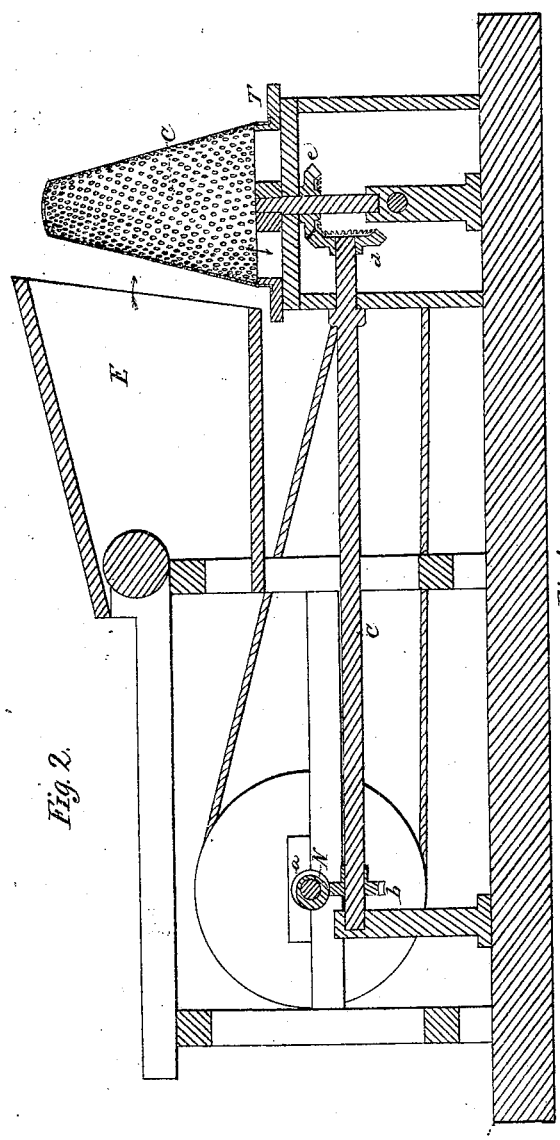
Figure 1:
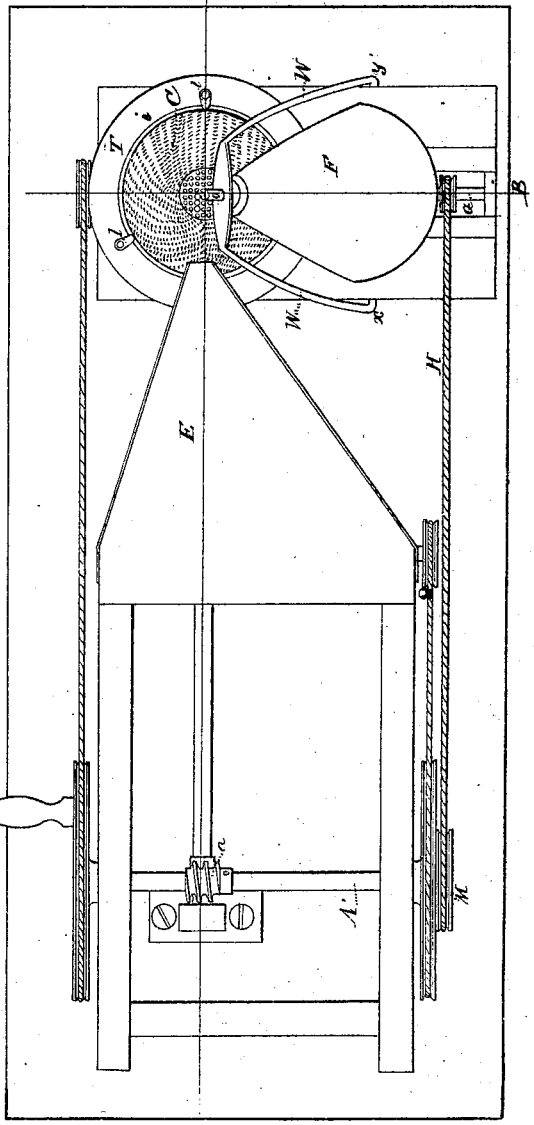

Figure 1 is a plan; Fig. 2, a vertical section upon the line A A of Fig. 1; Fig. 3, a vertical section upon the line B B of Fig. 1; Fig. 4, details which will be referred to hereafter.

The process of hardening hat bodies by immersion in hot water, as at present most generally practiced, is liable to many objections, among which may be enumerated the following: 1st, the hot water materially injures the quality of the fabric and the felting properties of the fur; 2d, the bodies being put away wet are liable to be frozen in winter or tainted and spoiled in summer. A method of dry hardening has therefore long been a desideratum and efforts have been made to accomplish this end by depositing the fur upon a grass cloth and covering it with a damp linen cloth. The whole were then removed from the perforated cone together, the hardening being effected by hand. This method has failed however to be productive of any useful result. The seams, folds and wrinkles in the grass and linen cloths were apt to leave their mark upon the fabric, and inferior, imperfect work was the result.

To avoid the defects of both the above methods and to harden the bodies without the use of hot water or of the grass or linen cloths is the object of my present invention, which consists in submitting the fur to the action of an elastic inflated rubber or felter, while it is being deposited, and before removing the perforated cone from the exhaust, by which means I am enabled to complete the process of hardening without wetting the bodies and without the use of grass or other cloths. The surface of this elastic felter clings to the fibers of the fur, and by the vibration of the cone a tremulous motion of the fibers upon each other is produced unaccompanied by any friction or slipping of the rubber upon the fur, which would inevitably be produced were the rubber rigid and non-elastic, and would result in a displacement of the fibers and imperfect work.

To enable others skilled in the art to understand my invention I will proceed to describe the manner in which I have carried it out.

In the accompanying drawings is represented an ordinary trunk and cone machine for forming hat bodies with my improvements attached. Those parts wherein my machine does not differ from similar machines as at present constructed will be simply referred to and those more immediately connected with the subject of my invention will be more particularly described.

C is the cone; D, the fan for producing the exhaust; E, the trunk through which the fur is wafted to the cone; $a$, $b$, $c$, $d$, $e$, the mechanism by means of which rotary motion is communicated from the driving shaft to the table T which sustains the perforated cone. The latter is secured to the table by means of the flange $i$ and buttons $l$.

F is the elastic cone felter which is constructed and operated as follows: O is a shaft passing through its center; R, the elastic felting surface which in the machine represented in the accompanying drawings is composed of india rubber fabric. Q is an elastic head to which the surface of the cone is secured, a similar head of much smaller dimensions being employed at the other end for the purpose. S is an india rubber tube secured to the heads of the cone rubber, through which the shaft O passes. The elastic rubber thus constructed is inflated through the opening $m$ in the lower head, which may be suitably closed by a valve in the ordinary way. The cone thus constructed is kept in place upon its shaft by the collars P and receives a rapid vibratory motion in the following manner: M is a pulley upon the driving shaft from which motion is communicated to the shaft G through the band H. $n$ is a crank pin upon this shaft which by means of the connecting arm $f$ communicates a rapid vibratory motion to the shaft O. As the perforated cone C revolves it carries with it the cone, F which revolves freely upon its shaft. The upper end of the shaft O is carried by the yoke W, which swings around the points $x$, $y$, by which means the elastic felters may be moved away from the perforated cone when required, as seen in red in Fig. 3.

It is not absolutely essential that the elastic felting cone be of the exact size of the perforated cone, but it is necessary that the two be similarly proportioned or that they be frusta of the same right cone, otherwise there would be a drag the one upon the other which would displace the fibers, rupture the fabric and produce imperfect work.

In Fig. 4 is represented the device which I employ for the purpose of hardening the tips of the bodies. U is a short cylinder to the lower open end of which is secured a disk of india rubber cloth or other suitable elastic substance. This cylinder has a rapid vibratory motion communicated to it in any efficient manner. This device however is not the subject of my present claims and need not therefore be further described.

Operation: The elastic felter being swung off from the perforated cone, as seen in red in Fig. 3, the deposition of the fur is commenced. When the cone has received a slight covering of fur the felter is swung back in contact therewith, and as the perforated cone continues to revolve the felter is carried around with it, and the latter at the same time receives a rapid vibratory motion in the manner already described. A tremulous motion is thus imparted to the elastic surface of the rubber, by which means the fibers are felted layer after layer in the exact position in which they are deposited upon the cone. The surface of the rubber being elastic adheres to the fibers while in contact with them and causes them to move upon and among each other, but without moving them out of place or disarranging them. By the time that the fur has all been deposited upon the cone it is sufficiently hardened to remove from the machine, and is carried with the cone upon which it is formed to the lip hardener (Fig. 4), beneath which it is placed. The cone and body remains stationary while the hardener is vibrated rapidly in contact with the tip, as in Fig. 4.

What I claim as my invention and desire to secure by Letters Patent, is—

The inflated elastic rubber herein described, constructed and operated in the manner substantially as herein set forth.

RUSSEL WILDMAN.

Witnesses:
SAM. COOPER,
THOS. L. GLOVER.